United States Patent
Kang et al.

(10) Patent No.: US 9,547,760 B2
(45) Date of Patent: Jan. 17, 2017

(54) METHOD AND SYSTEM FOR AUTHENTICATING USER OF A MOBILE DEVICE VIA HYBRID BIOMETICS INFORMATION

(71) Applicant: Samsung Electronics Co., Ltd., Gyeonggi-do (KR)

(72) Inventors: Sangki Kang, Gyeonggi-do (KR); Kyungtae Kim, Gyeonggi-do (KR); Sanghoon Lee, Seoul (KR); Yangwook Kim, Gyeonggi-do (KR); Chulhwan Lee, Seoul (KR); Seokyeong Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 86 days.

(21) Appl. No.: 13/774,390

(22) Filed: Feb. 22, 2013

(65) Prior Publication Data
US 2013/0227678 A1   Aug. 29, 2013

(30) Foreign Application Priority Data
Feb. 24, 2012 (KR) .................. 10-2012-0019333

(51) Int. Cl.
*G06F 21/00* (2013.01)
*G06F 21/32* (2013.01)
(Continued)

(52) U.S. Cl.
CPC ........... *G06F 21/32* (2013.01); *G06K 9/00335* (2013.01); *G10L 17/10* (2013.01); *G06K 9/00892* (2013.01); *G06K 9/6293* (2013.01); *G10L 15/25* (2013.01)

(58) Field of Classification Search
None
See application file for complete search history.

(56) References Cited

U.S. PATENT DOCUMENTS 6,101,264 A    8/2000   Wagner et al.
6,216,940 B1 *  4/2001   Sugano et al. ............... 228/147
(Continued)

FOREIGN PATENT DOCUMENTS

EP        1962280 A1      8/2008
KR    10-0820141 B1      4/2008
KR   10-2008-0092778 A  10/2008

OTHER PUBLICATIONS

Aaraj, Najwa; Ravi, Srivaths; Raghunathan, Anand; Jha, Niraj K. Architectures for Efficient Face Authentication in Embedded Systems. DATE '06, Proceedings vol. 2. Pub. Date: 2006. http://ieeexplore.ieee.org/stamp/stamp.jsp?tp=&arnumber=1657105.*

(Continued)

*Primary Examiner* — Jeremiah Avery
(74) *Attorney, Agent, or Firm* — Cha & Reiter, LLC.

(57) ABSTRACT

A system and method is provided that authenticates a user using hybrid biometrics information, such as a user's image information, a user's voice information, etc. The user authentication method includes: acquiring a number of biometrics information; generating a number of authentication information corresponding to the acquired biometrics information; and performing an integral user authentication based on the by generated authentication information.

23 Claims, 9 Drawing Sheets

(51) Int. Cl.
*G10L 17/10* (2013.01)
*G06K 9/62* (2006.01)
*G06K 9/00* (2006.01)
*G10L 15/25* (2013.01)

(56) References Cited

U.S. PATENT DOCUMENTS

| | | | |
|---|---|---|---|
| 6,219,639 B1 | 4/2001 | Bakis et al. | |
| 6,219,640 B1* | 4/2001 | Basu | G06K 9/00221 |
| | | | 704/231 |
| 6,314,401 B1* | 11/2001 | Abbe | G07C 9/00087 |
| | | | 704/272 |
| 6,421,453 B1* | 7/2002 | Kanevsky | G06F 21/316 |
| | | | 340/5.2 |
| 6,964,023 B2* | 11/2005 | Maes | G06F 3/0481 |
| | | | 704/E15.041 |
| 8,370,262 B2* | 2/2013 | Blessing | G06F 21/32 |
| | | | 235/379 |
| 8,452,307 B1* | 5/2013 | Fujisaki | H04W 64/006 |
| | | | 455/414.1 |
| 2004/0059923 A1* | 3/2004 | ShamRao | G06F 21/32 |
| | | | 713/186 |
| 2004/0267521 A1 | 12/2004 | Cutler et al. | |
| 2006/0136219 A1 | 6/2006 | Wang | |
| 2009/0227232 A1* | 9/2009 | Matas | H04M 1/665 |
| | | | 455/411 |
| 2011/0102142 A1* | 5/2011 | Widger | G09B 5/06 |
| | | | 340/5.83 |
| 2011/0317872 A1 | 12/2011 | Free | |
| 2014/0162598 A1* | 6/2014 | Villa-Real | H04M 1/66 |
| | | | 455/411 |

OTHER PUBLICATIONS

Glowacki, Marcin; Piotrowski, Zbigniew. Architecture of the integrated system for voice identity distribution. 19th International Conference on Microwave Radar and Wireless Communications (MIKON). vol. 2. Pub. Date: 2012. http://ieeexplore.ieee.org/stamp/stamp.jsp?tp=&arnumber=6233590.*

Chibelushi, Claude C.; Deravi, Farzin; Mason, John S. D. A Review of Speech-Based Bimodal Recognition. IEEE Transactions on Multimedia. vol. 4. Issue: 1. Pub. Date: 2002. http://ieeexplore.ieee.org/stamp/stamp.jsp?arnumber=985551.*

Aggarwal, Sucharu; Jindal, Alka. Comprehensive Overview of Various Lip Synchronization Techniques. International Symposium on Biometrics and Security Technologies, 2008. ISBAST 2008. http://ieeexplore.ieee.org/stamp/stamp.jsp?arnumber=4547666.*

Petar S. Aleksic & Aggelos K. Katsaggelos. Audio-Visual Biometrics. Proceedings of the IEEE, IEEE. New York, U.S., vol. 94, No. 11, Nov. 1, 2006, pp. 2025-2044, XP011442812, ISSN: 0018-9219, D0I:10.1109/JPROC.2006.886017.

S. Palanivel & B. Yegnanarayana. Multimodal Person Authentication Using Speech, Face and Visual Speech. Computer Vision and Image Understanding, Academic Press, U.S., vol. 109, No. 1, Dec. 14, 2007, pp. 44-55, XP022391254, ISSN: 1077-3142, DOI: 10.1016/J.CVIU.2006.11.013.

* cited by examiner

METHOD AND SYSTEM FOR AUTHENTICATING USER OF A MOBILE DEVICE VIA HYBRID BIOMETICS INFORMATION

CLAIM OF PRIORITY

This application claims the benefit under 35 U.S.C. §119 (a) of an earlier Korean patent application filed on Feb. 24, 2012 in the Korean Intellectual Property Office and assigned Serial No. 10-2012-0019333, the entire disclosure of which is hereby incorporated by reference.

BACKGROUND OF THE INVENTION

1. Field of the Invention

This invention relates to a system and method that authenticates a user using hybrid biometrics information, such as a user's image information, a user's voice information, etc.

2. Description of the Related Art

With the development of information and digital communication technology, various types of portable devices have been introduced to provide communication services and process user information. Examples of the user devices are mobile communication terminals, Personal Digital Assistants (PDAs), electronic organizers, smart phones, tablet PCs, etc. These devices may be equipped with a variety of functions, such as, a voice call, a message transmission for Short Message Service (SMS)/Multimedia Message Service (MMS) for example, a video call, an electronic organizer, a camera function, an emailing function, a broadcast playback, a video playback, an Internet function, an e-commerce function, an audio playback, a schedule function, a Social Networking Service (SNS), a messenger, a dictionary, a game device, etc.

User devices are also equipped with a security function to prevent unauthorized users from accessing the devices. For example, when user devices with a security function are turned on, a lock screen may be displayed, so that a user can release the lock state only if the preset passwords are applied to the lock screens. In recent years, biometrics has been used to identify humans by their characteristics, e.g., finger prints, faces, voices, retinas, irises, etc., and, as it has proven to provide a relatively high level of security, it has been implemented in user authentication systems and its application rapidly growing.

When conventional user authentication systems applied to user devices identify users by their characteristics, they require the users to directly input their fingerprint information to a fingerprint identifier installed to the devices or to directly place their eye close to an iris identifier installed to the devices. As such, since conventional user authentication systems force users to take specific steps to acquire their biometrics information, they inconvenience users.

Meanwhile, if facial information or voice information is used to identify users, they can reduce user inconvenience and discomfort while they are inputting the information thereto. In particular, since conventional user authentication systems using facial or voice information can use a camera module or a microphone of a user device, they don't need additional input parts, and this can thus reduce costs when they are installed to the user devices. Therefore, researches and developments regarding user authentication systems using facial or voice information from among biometrics information are growing.

It is in light of this background information related to the user authentication that the significant improvements of the present invention have evolved.

SUMMARY OF THE INVENTION

The present invention provides a user authentication system and method that can perform user authentication in a user device using hybrid biometrics information.

The present invention further provides a user authentication system and method that can perform integral user authentication in a user device based on image authentication information and voice authentication information, thereby increasing the security performance.

The present invention further provides a user authentication system and method that can perform integral user authentication in a user device based on image authentication information, voice authentication information, and additional information regarding variation in face shape, mouth shape, and eye shape.

The present invention further provides a user authentication system and method that can perform integral user authentication in a user device based on image authentication information and voice authentication information, with an additional determination as to whether to synchronize a mouth motion and a voice.

The present invention further provides a user authentication system and method that implements an optimal environment where user devices can enhance the security performance while performing user authentication during an authentication mode, and thus enhances user convenience and product competitiveness.

In accordance with an exemplary embodiment of the invention, the invention provides a user authentication method including: acquiring voice information and image information; detecting a facial feature value and an object feature value configuring the face, based on the image information, and a voice feature value based on the voice information; and performing an integral user authentication to determine whether the detected feature values match previously stored information over a predetermined amount (e.g. whether the difference between the detected feature values and the previously stored information is less than a certain threshold).

In accordance with another exemplary embodiment of the invention, the invention provides a user authentication method including: acquiring a number of biometrics information for user authentication that differ from each other; generating a number of authentication information corresponding to the acquired biometrics information respectively; and performing an integral user authentication based on the generated authentication information.

Preferably, the method may be implemented with programs that can be executed by a processor, which are stored in a computer-readable recording media.

In accordance with another exemplary embodiment of the invention, the invention provides a recordable medium with a program that: acquires a number of biometrics information for user authentication that differs from each other; generates a number of authentication information corresponding to the acquired biometrics information, respectively; and performs an integral user authentication, based on the generated authentication information.

In accordance with another exemplary embodiment of the invention, the invention provides a mobile device including: a camera module for acquiring an image; a microphone for acquiring a voice; and a controller. The controller acquires a facial feature value and an object feature value defining a face based on the acquired image information, and a voice feature value based on the acquired voice information. The controller performs an integral user authentication to determine whether the feature values match previously stored information over a predetermined amount (e.g. whether the difference between the detected feature values and the previously stored information is less than a certain threshold). The pre-stored information includes image information regarding the user's face, information regarding a user's voice when he/she made an utterance with respect to a specific word, etc. The pre-stored information includes the presence of a specific object, e.g., a motion of lips or eyes, etc. In accordance with another exemplary embodiment of the invention, the controller performs integral user authentication, using a number of authentication information that are generated based on the acquired pieces of biometrics information.

Another aspect of the present invention provides a computer program comprising instructions arranged, when executed, to implement a method, system and/or apparatus, in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, disclose exemplary embodiments of the invention.

The preceding summary is merely intended to provide a few aspects of the user authentication system and method of the invention, and is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The above features and advantages of the invention will become more apparent from the following detailed description viewed in conjunction with the accompanying drawings, in which.

DETAILED DESCRIPTION OF EXEMPLARY EMBODIMENTS

Figure 1:
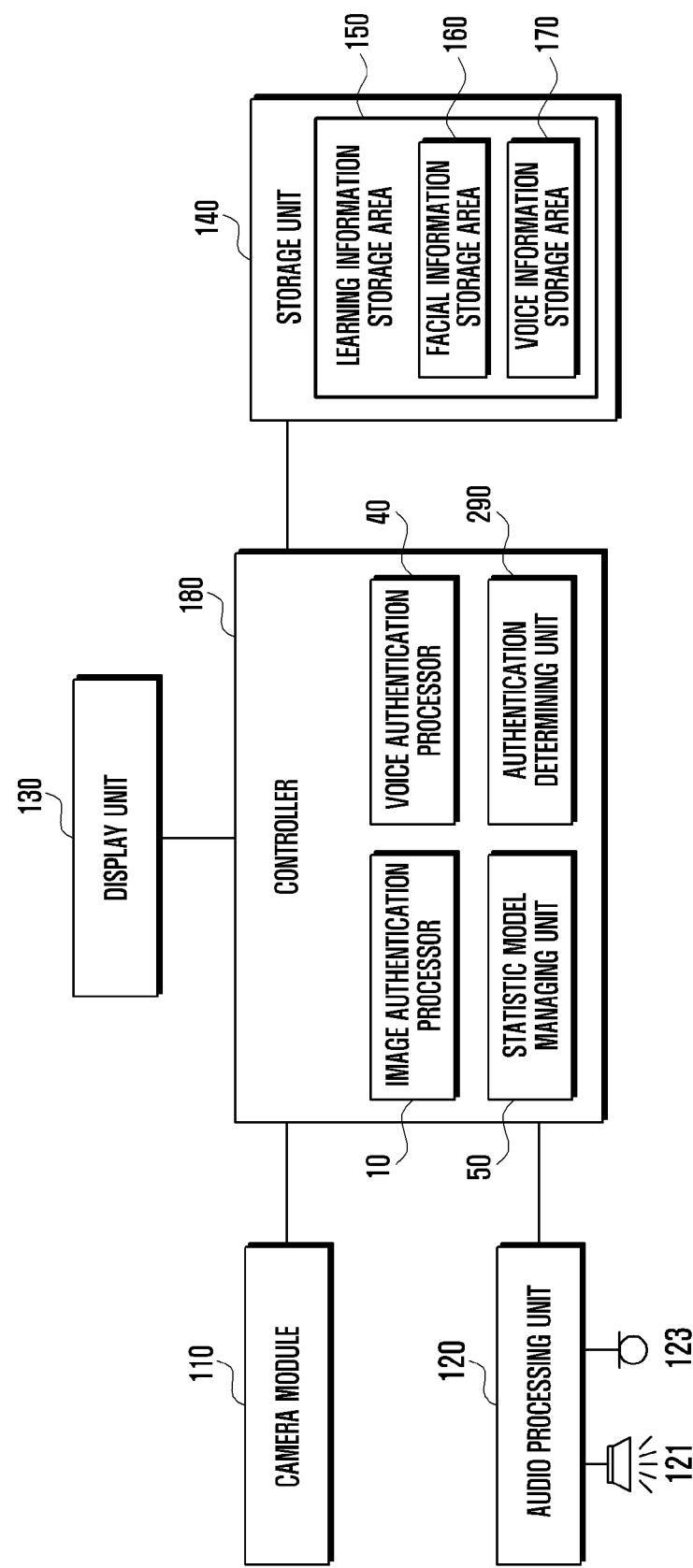
FIG. 1 illustrates a schematic block diagram of a user device according to an embodiment of the invention.

Hereinafter, exemplary embodiments of the invention are described in detail with reference to the accompanying drawings.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims.

The same reference numbers are used throughout the drawings to refer to the same or similar parts. For the purposes of clarity and simplicity, detailed descriptions of well-known functions and structures incorporated herein may be omitted to avoid obscuring the subject matter of the invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, it is to be understood that the singular forms "a," "an," and "the" include plural referents unless the context clearly dictates otherwise, Thus, for example, reference to "an object" includes reference to one or more of such objects.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The configuration and control operations of the user device according to the invention are described in detail referring to the accompanying drawings. The following description is provided to assist in a comprehensive understanding of the present invention, as defined by the claims. The description includes various specific details to assist in that understanding but these are to be regarded as merely exemplary. It should be understood that the invention is not limited the embodiments. It should be understood that there are many modifications from the embodiments. Although the embodiments are described based on hardware, it should be understood that the invention includes technology using both hardware and software. Therefore, it should be understood that the invention also includes software based technology.

FIG. 1 illustrates a schematic block diagram of a user device 100 according to an embodiment of the invention.

Referring to FIG. 1, the user device 100 includes a camera module 110, an audio processing unit 120, a display unit 130, a storage unit 140 and a controller 180. Although it is not shown in the drawings, it will be noted that the user device 100 may further include: a digital broadcast module for receiving and playing back digital broadcasts (e.g., mobile broadcasts related to Digital Multimedia Broadcasting (DMB), Digital Video Broadcasting (DVB), etc.); one or more short-range wireless communication modules for supporting short-range wireless communication, such as Bluetooth communication, Infrared Data Association (IrDA) communication, Radio Frequency Identification (RFID) communication, Near Field Communication (NFC), etc.; an input unit for supporting an input function based on hard keys; a Radio Frequency (RF) module for supporting a mobile communication-based voice/video call, and a data communication function; a unit for generating vibration; a wireless Local Area Network (WLAN) module for supporting Internet services; a battery for supplying electric power to the components listed above; etc. Since these elements are well-known to an ordinary person skilled in the art, a detailed description is omitted in the following description.

In operation, the camera module 110 takes still images and moving images under the control of the controller 180, and transfers the acquired image data to the display unit 130. The camera module 110 includes an image sensor (or camera sensor) (not shown) for converting an optical signal into an electrical signal, and an image processor (signal processor) for processing the electrical signal from the image sensor into a digital video signal. In an embodiment of the invention, the image sensor may be implemented with a Charge Coupled Device (CCD) image sensor or a Complementary Metal Oxide Semiconductor (CMOS) image sensor. In particular, the camera module 110 is activated during an authentication mode, takes a still image or moving images of an object (e.g., a user's face), under the control of the controller 180, and then transfers the corresponding signals to the controller 180.

The audio processing unit 120 includes a speaker 121 and a microphone 123. The audio processing unit 120 outputs/receives audio signals to/from the outside of the user device 100. The audio processing unit 120 transfers audio signals, output from the controller 180, to the speaker 121. The audio processing unit 120 also transfers audio signals such as voices, input via the microphone 123, to the controller 180. The audio processing unit 120 converts voice/audio data into audible signals and then outputs them via the speaker 121 according to the control of the controller 180. The audio processing unit 120 also converts audio signals such as voices, received via the microphone 123, into digital signals and then transfers them to the controller 180. In particular, the audio processing unit 120 receives a user's voice during an authentication mode for user authentication, converts it into a digital signal, and transfers it to the controller 180. The audio processing unit 120 may also output a sound effect, as a feedback operation as to whether user authentication is successful or fails in an authentication mode, via the speaker 121, under the control of the controller 180. It should be understood that the feedback operation as to whether user authentication is successful or not may be set in various types of output modes, for example according to user or manufacturer settings.

The display unit 130 displays a variety of screens related to operations and states of the user device 100, e.g., a lock screen, a home screen, a menu screen, a message writing screen, a chatting screen, a video playback screen, screens according to the execution of a variety of applications, etc.

The display unit 130 displays menus of the user device 100, and information input by the user or information provided to the user. The display unit 130 displays screens when user functions are executed in the user device 100. The display unit 130 may be implemented with a flat display panel, such as a Liquid Crystal Display (LCD), Light Emitting Diode (LEDs), Organic Light Emitting Diodes (OLEDs), Active Matrix Organic Light Emitting Diodes (AMOLEDs), or the like. The display unit 130 may also be implemented with a flexible display. A flexible display refers to a rollable display that is formed like a paper sheet and can be flexible and rolled up into a scroll. The display unit 130 may be implemented with a touch-based interface, e.g., a touch screen. In this case, the display unit 130 can support various types of touch inputs, generates the corresponding signals and transfer them to the controller 180. The display unit 130 can display the screens in a portrait/landscape mode according to the orientation of the user device 100 or the angle of the user device 100. The display unit 130 can display the screens, adaptively switching between portrait and landscape modes according to the orientation of the user device 100 or the angle of the user device 100. In particular, the display unit 130 can display a specific image provided according to the control of the controller 180 during an authentication mode for user authentication. For example, the display unit 130 may display information regarding a user's facial image captured via the camera module 110 during the authentication mode.

The storage unit 140 stores data and application programs executed in the user device 100. The storage unit 140 may be comprised of one or more volatile memory devices and non-volatile memory devices. For example, the storage unit 140 may include Read Only Memory (ROM), flash memory, Random Access Memory (RAM), hard disks, etc. The storage unit 140 may also include external storage media, such as, external hard disks, memory cards, etc. The storage unit 140 may permanently or temporarily store an Operating System (OS) of the user device 100 and data and programs related to the display control of the display unit 130. The storage unit 140 may also permanently or temporarily store data and programs related to the operation of a user authentication function using hybrid biometrics information (e.g., facial information and voice information) during an authentication mode. In particular, the storage unit 140 may store data, related to images captured via the camera module 110 in an authentication mode, as static or dynamic data respectively. The storage unit 140 may store learning information for identifying biometrics information input to authenticate a user during the authentication mode, in a learning information storage area 150. The learning information is classified into facial information and voice information, which are stored in corresponding allocated storage areas respectively. The facial information is created in such a way that: a facial feature is extracted from a user's image used for user authentication during an authentication mode and a facial feature value, e.g., a facial feature vector, is created from the extracted facial feature, as a statistic model for facial recognition. For example, the facial feature value may comprise one or more components for characterizing the extracted facial feature to enable the characterized facial feature to be compared to facial features in captured images. The facial information is stored in a facial information storage area 160. Likewise, the voice information is created in such a way that: a voice feature is extracted from a user's voice used for user authentication in an authentication mode and a voice feature value, e.g., a voice feature vector, is created from the extracted voice feature, as a statistic model for speech recognition. For example, the voice feature value may comprise one or more components for characterizing the extracted voice feature to enable the characterized voice feature to be compared to voice features in captured audio data. The voice information is stored in a voice information storage area 170.

The storage unit 140 includes a program storage area and a data storage area. The program storage area stores an operating system (OS) for booting the user device 100 and controlling the entire operation of the components therein, and a number of application programs that are downloaded or installed in the user device 100. The data storage area stores data created when the user device 100 is used or data created or used when applications are executed. The data storage area also buffers or stores image data or voice data input during an authentication mode.

The controller 180 controls the entire operation of the user device 100. The controller 180 controls operations related to user authentication using hybrid biometrics information, such as facial information and voice information, in an authentication mode. The controller 180 can process an integral authentication procedure for a user, based on pieces of hybrid biometrics information in an authentication mode, such as a facial recognition result, a speech recognition result, an object identifying result, and a synchronization determining result. If the controller 180 ascertains that a user is identified as an unauthorized user via any one of the pieces of hybrid biometrics information, it concludes that the user authentication has failed. For example, the controller 180 determines whether each of the results satisfies a preset probability (e.g., 80%, 85%, 90%, etc.), and outputs the determination as to whether a corresponding user is an authorized or unauthorized user of the user device 100. As such, the controller 180 can determine whether the user authentication is successful by determining whether respective results satisfy corresponding probabilities. Integral authentication or hybrid authentication may be, for example, a process for authentication in which two or more authentication processes using different types of biometric information are combined in an overall authentication process. The number and types of biometric information used in an integral or hybrid authentication may be varied. For example, two or more types of biometric information may be used, and any suitable types of biometric information may be used, for example voice, facial features, fingerprints etc.

The controller 180 includes an image authentication processor 10, a voice authentication processor 40, a statistic model managing unit 50, and an authentication determining unit 290. The controller 180 controls the entire operation related to the invention, which will be described in detail later with reference to the accompanying drawings.

The controller 180 may also control other normal operations of the user device 100 other than the operations according to the invention. For example, the controller 180 controls operations in response to touch-events that occur in the touch-based interface. In addition, the controller 180 may also control data communication in wired/wireless mode. The controller 180 may be implemented with a System on Chip (SoC) that integrates a (Central Processing Unit) CPU, a (Graphical Processing Unit) GPU, memory devices, etc. into a single chip. The components in the SoC are connected to each via system bus and perform data communication via the system bus. Alternatively, the controller 180 may be formed in such a way that a CPU, a GPU, memory devices, etc. are packaged in multi-layers.

The user device according to the invention includes all information communication devices, multimedia devices, and their applications, which support a user authentication function and are operated according to communication protocols corresponding to various types of communication systems. For example, the user device can be applied to mobile communication terminals, tablet personal computers (tablet PCs), smart phones, digital cameras, Portable Multimedia Players (PMPs), media players, mobile game players, Personal Digital Assistants (PDAs), etc. In addition, the method according to the invention can be adapted to digital televisions, Digital Signages (DSs), Large Format Displays (LFDs), laptop computers, etc.

Figure 2:
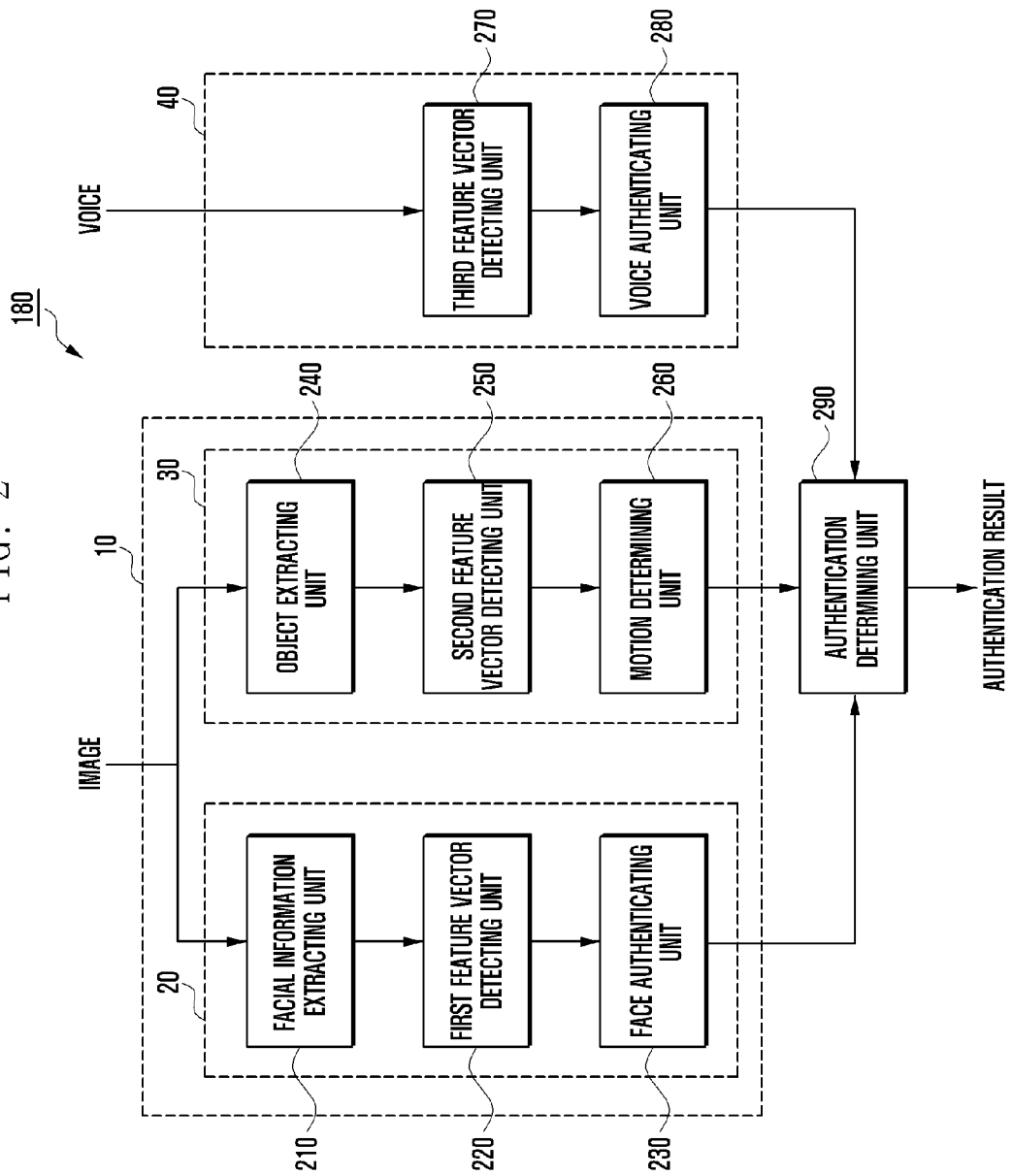
FIG. 2 illustrates a detailed view showing a first embodiment of the controller shown in FIG. 1.

FIG. 2 illustrates a detailed view showing a first embodiment of the controller 180 shown in FIG. 1.

Referring to FIG. 2, the image authentication processor 10 processes user authentication by detecting a facial feature value, e.g., a facial feature vector, and an object feature value, e.g., an object feature vector, from an image acquired via the camera module 110. The voice authentication processor 40 processes a user authentication by detecting a voice feature value, e.g., a voice feature vector from a voice acquired via the microphone 123. The authentication determining unit 290 processes an integral authentication for the user, based on respective authentication information (e.g., facial authentication information and voice authentication information) output from the image authentication processor 10 and the voice authentication processor 40. The image authentication processor 10 includes a facial authentication processor 20 and an object authentication processor 30. The facial authentication processor 20 processes facial authentication by detecting a static feature vector based on a still image captured from the acquired image. The object authentication processor 30 processes object authentication by detecting a dynamic feature vector of a specific object (e.g., a face, eyes, lips, etc.) based on the acquired image. In an embodiment of the invention, the object(s) refers to a region (regions) corresponding to a part (parts) of a face divided in the acquired/recognized image, e.g., the entire face, eyes, lips, etc. The object feature vector is detected from this type of object where an n-dimensional vector of numerical features that represent some object, i.e., a numerical representation of objects required for the algorithms to recognize an image as representation facilitate processing and statistical analysis. Hence, when representing images, the feature values might correspond to the pixels of an image. For example, the object feature vector may be a dynamic feature vector representing the movement of the face, the blinking of the eye, the movement of the lips, etc.

The facial authentication processor 20 includes a facial information extracting unit 210, a first feature vector detecting unit 220, and a face authenticating unit 230.

The facial information extracting unit 210 extracts a user's face from the image received by the camera module 110. For example, the facial information extracting unit 210 can extract features of the facial region, eye regions, mouth region, etc. from the user's facial image received by the camera module 110 and output them. The facial information extracting unit 210 captures images, received via the camera module 110 and displayed on the display unit 130. The facial information extracting unit 210 performs facial recognition and facial feature extraction for the user's face with respect to the captured still image.

The first feature vector detecting unit 220 extracts a facial feature vector (e.g., the distance between preset marker points on the eyes, nose, and mouth of the face, the skin color, etc.) from the features extracted via the facial information extracting unit 210. For example, the first feature vector detecting unit 220 normalizes the face shape via the center points on the eyes from the features extracted by the facial information extracting unit 210. After that, the first feature vector detecting unit 220 extracts the unique facial feature vector from the normalized facial image and outputs it.

The face authenticating unit 230 performs authentication with respect to the facial image, by comparing the facial feature vector, a unique feature of the face extracted by the first feature vector detecting unit 220, with the previously registered facial information (i.e., a statistic model for facial recognition), and outputs the authentication information according to the authentication result. For example, the face authenticating unit 230 compares the extracted facial feature vector with a previously stored that where the facial information created and stored by learning, and determines whether they match each other based on a preset error range. For example, if the face authenticating unit 230 ascertains that the extracted facial feature vector matches the previously stored, facial information by over 90%, it outputs authentication information representing an authorized user. On the contrary, if the extracted facial feature vector matches the previously stored data, facial information by less than 90% (which also includes a case where a facial feature vector cannot be acquired or a face is not captured), it outputs authentication information representing an unauthorized user. Although the embodiment is implemented in such a way that a determination as to whether the facial authentication is successful is made based on 90% as a reference value, it should be understood that the reference value may be variably set according to a user's settings, e.g., 80%, 85%, etc.

The object authentication processor 30 includes an object extracting unit 240, a second feature vector detecting unit 250 and a motion determining unit 260. The object authentication processor 30 may be a motion recognizing unit that detects objects (e.g., face, eyes, mouth, etc.) from an image (i.e., a moving image/video) of the camera module 110 and identifies the objects moving.

The object extracting unit 240 extracts objects from an image received via the camera module 110. In an embodiment of the invention, the objects refer to elements to identify the movement in a user's face, e.g., the face, eyes, mouth, etc. For example, the object extracting unit 240 may extract a region of a preset object from the facial image, e.g., a facial region, eye region, or mouth region, and output it. That is, the object extracting unit 240 can detect a location of a preset object from an image that is received via the camera module 110 and displayed on the display unit 130.

The second feature vector detecting unit 250 can detect an object feature vector representing the movement (motion) of the object at the location where the object is detected via the object extracting unit 240 (e.g., the movement of the face, the blinking of the eyes, the movement of the mouth, etc.). For example, the second feature vector detecting unit 250 can detect a feature vector, based on the mouth, as one of the features extracted via the object extracting unit 240, i.e., the size of the mouth, the shape of lips, etc., varied according to the movement of the mouth, and can then output it. Alternatively, the second feature vector detecting unit 250 can detect a feature vector based on the eye as one of the features extracted via the object extracting unit 240, i.e., variation of the eye shape (e.g., the blinking of the eye), and can then output it. Alternatively, the second feature vector detecting unit 250 can detect a feature vector based on the face as one of the features extracted via the object extracting unit 240, i.e., the change in size of the face, the change in location of the face, etc., according to the movement of the face, and can then output it.

The motion determining unit 260 identifies the movement (motion) of a corresponding object from the object feature vector detected via the second feature vector detecting unit 250, performs user authentication, and outputs motion information (authentication information) according to the authentication outcome. For example, when the motion determining unit 260 ascertains that a corresponding object has moved, it can output the motion information representing that the object has moved. On the contrary, when the motion determining unit 260 ascertains that a corresponding object has not moved, it can output the motion information representing that the object has not moved.

The voice authentication processor 40 includes a third feature vector detecting unit 270 and a voice authenticating unit 280.

The third feature vector detecting unit 270 can detect a voice feature vector from a voice received via the microphone 123 (e.g., tone, frequency, words, speech speed, etc.), and outputs it. The third feature vector detecting unit 270 can detect one or more feature vectors according to the operation modes for voice authentication. For example, if voice authentication is performed in a mode irrespective of words that the user uses while speaking (i.e., an authentication mode where only the tone or frequency in a user's speech is identified, irrespective of the user's spoken words), the third feature vector detecting unit 270 can detect one or more preset feature vectors, e.g., voice tone, frequency, speech speed, etc. On the contrary, if voice authentication is performed in a mode where user's spoken words are identified (e.g., an authentication mode where preset words are required to be input), the third feature vector detecting unit 270 can detect one or more preset feature vectors, e.g., voice tone, frequency, and speech speed, and also a feature vector of a word identified from the voice.

The voice authentication processor 40 may request to acquire voice information via a preset word or a randomly created word. That is, if the user intends to execute integral authentication, the voice authentication processor 40 may display one randomly selected word from among the words stored in the storage unit 140 on the display unit, so that the user can pronounce it. For example, the voice authentication processor 40 may present a specific word or randomly created words, stored in the storage unit 140, e.g., 'Han River, Railway, Bridge, Repair, Construction, Accident, Occurrence," etc. on the display unit. The voice authentication processor 40 determines whether the acquired voice information matches voice information regarding the represented word/words and performs authentication procedures according to the determination results. Alternatively, the voice authentication processor 40 may randomly select and present one of the preset questions, e.g., 'Please tell your mother's name,' 'How old is your second daughter?' etc. After that, the voice authentication processor 40 determines whether the acquired voice information matches the answer of the question, and then performs an authentication procedure according to the determination result. The answers of the questions may be set according to the user's settings, and stored in the storage unit 140. Alternatively, the user device may be set with an answer regarding a specific question, where the answer is varied over time. For example, if questions are related to the current age of a person, the number of years of marriage, etc., the answers vary as time progresses from the first signed up data.

The voice information for the acquired word/words may be applied to image information and object motion information. The voice information may also be applied to synchronization information as to determine whether the start time point and the end time point of an utterance of an object, e.g., a mouth shape, are synchronized with each other. The voice authenticating unit 280 performs voice authentication by comparing the voice feature vector, as a unique feature of a voice detected via the third feature vector detecting unit 270, with previously registered voice information (i.e., a statistic model for speech recognition), and outputs the authentication information according to the authentication result. For example, the voice authenticating unit 280 compares the detected voice feature vector with the previously stored voice information that was created and stored by learning process, and determines whether they match each other. The determination as to whether the detected voice feature vector matches the previously stored voice information is made based on a preset error range. For example, if the voice authenticating unit 280 ascertains that the detected voice feature vector matches the stored, voice information by over 90%, it outputs authentication information representing an authorized user. On the contrary, if the voice authenticating unit 280 ascertains that the detected voice feature vector matches the stored, voice information by less than 90% (including a case where a voice feature vector cannot be acquired or a voice is not captured), it outputs authentication information representing an unauthorized user. Although the embodiment is implemented in such a way that a determination as to whether the voice authentication is successful is made based on 90% as a reference value, it should be understood that the reference value may be variably set according to a user's settings, e.g., 80%, 85%, etc.

The voice authenticating unit 280 can perform authentication using one or more feature vectors according to the operation modes for voice authentication. For example, if voice authentication is performed in a mode irrespective of words that the user uses while speaking, the voice authenticating unit 280 performs authentication by comparing the feature vector, detected by the third feature vector detecting unit 270, with only the corresponding feature vector from among the voice information that was previously created through learning process. On the contrary, if voice authentication is performed in a mode where a user's spoken words are identified, the voice authenticating unit 280 performs authentication by comparing a word feature vector from among the feature vectors, transferred from the third feature vector detecting unit 270, with the voice information created by learning (i.e., a word feature vector). That is, the voice authenticating unit 280 performs by determining whether an input word matches a previously learned word during comparison. The voice authenticating unit 280 compares a recognized word feature vector with a learned word feature vector, thereby performing authentication for a word in an input voice. If authentication for the word feature vector has been successful, the voice authenticating unit 280 compares another feature vector (e.g., at least one of a voice tone, frequency, and speech speed), transferred from the third feature vector detecting unit 270, with the previously learned, voice information (e.g., at least one of a voice tone, frequency, and speech speed), thereby performing the authentication. It should be understood that the voice authentication procedure may be executed in various modes according to a user's settings.

The authentication determining unit 290 performs an integral authentication using the facial authentication information, transferred from the facial authentication processor 20, the motion information, transferred from the object authentication processor 30, and the voice authentication information transferred from the voice authentication processor 40, as described above, and then outputs the authentication outcome. If the authentication determining unit 290 analyzes the facial authentication information, the motion information, and the voice authentication information, and ascertains that they all correspond to an authorized user, it can authenticate the user as an authorized user, i.e., perform a normal user authentication. On the contrary, after analyzing the facial authentication information, the motion information, and the voice authentication information, if the authentication determining unit 290 detects that any one of them corresponds to an unauthorized user, it processes the user authentication as a failure. For example, if the authentication determining unit 290 detects that: the facial authentication information identifies the user's face as an authorized user; a motion of the object determined by the motion information is identified as a corresponding motion state; and the voice authentication information identifies the user's voice as an authorized user, it can authenticate the user, i.e., it can conclude that the user authentication has been successful. On the contrary, if the authentication determining unit 290 detects that: the facial authentication information identifies the user's face as an unauthorized user; a motion of the object determined by the motion information is not identified as a corresponding motion state; or the voice authentication information identifies the user's voice as an unauthorized user, it can process the user authentication as a failure.

Figure 3:
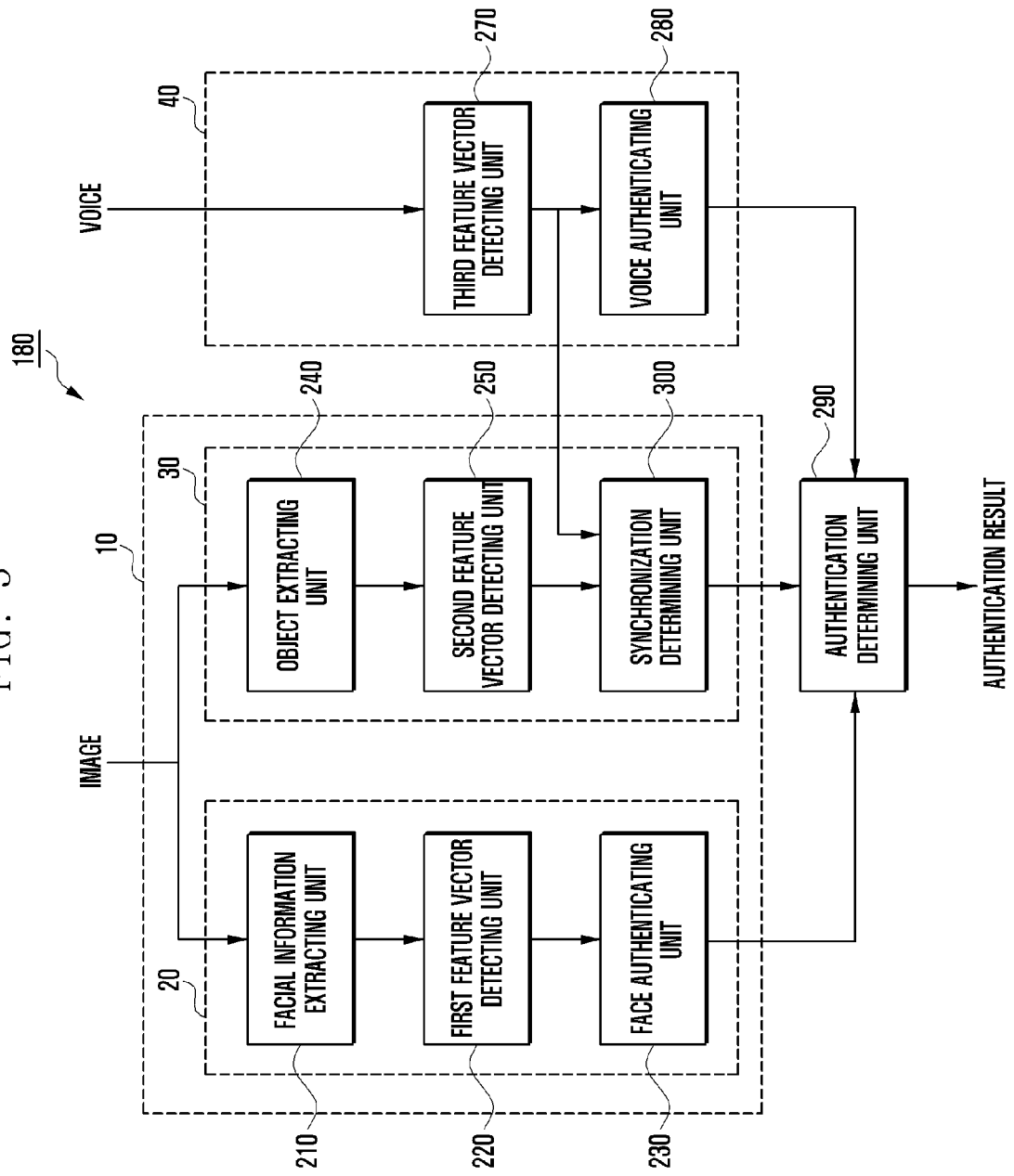
FIG. 3 illustrates a detailed view showing a second embodiment of the controller shown in FIG. 1.

FIG. 3 illustrates a detailed view showing a second embodiment of the controller 180 shown in FIG. 1.

Referring to FIG. 3, the controller 180 includes an image authentication processor 10, a voice authentication processor 40, and an authentication determining unit 290. The image authentication processor 10 processes user authentication by detecting a facial feature vector from an image acquired via the camera module 110. The voice authentication processor 40 processes a user authentication by detecting a voice feature vector from a voice acquired via the microphone 123. The authentication determining unit 290 processes an integral authentication for the user, based on of the respective authentication information (e.g., facial authentication information and voice authentication information) output from the image authentication processor 10 and the voice authentication processor 40. The image authentication processor 10 includes a facial authentication processor 20 and an object authentication processor 30. The facial authentication processor 20 processes facial authentication by detecting a static feature vector based on a still image captured from the acquired image. The object authentication processor 30 processes object authentication by detecting a dynamic feature vector of a specific object (e.g., a face, eyes, lips, etc.) based on the acquired image.

As shown in FIG. 3, the second embodiment of the controller 180 is configured in the similar way as the first embodiment as shown in FIG. 2, except that the motion determining unit 260 of the first embodiment is replaced with the synchronization determining unit 300 that further receives a signal from the voice authentication processor 40. Detailed descriptions of the components that have been already shown in FIG. 2 and described in the corresponding section will be omitted to avoid redundancy. It should be understood that, although the invention is implemented with two embodiments as shown in FIGS. 2 and 3, there may be other embodiments modified from them in such a way that:

the functions of the motion determining unit 260 and the synchronization determining unit 300 are implemented as one new component; or both the components may be included in the controller 180.

The object authentication processor 30 includes an object extracting unit 240, a second feature vector detecting unit 250 and a synchronization determining unit 300. The second feature vector detecting unit 250 can detect an object feature vector representing the movement (motion) of the object at the location where the object is detected via the object extracting unit 240 (e.g., the movement of the face, the blinking of the eyes, the movement of the mouth, etc.), and output it. For illustrative purposes, the second embodiment is described where the object is the mouth. Thus, we second feature vector detecting unit 250 detects an object feature vector, i.e., the size of the mouth, the shape of lips, etc., varied according to the movement of the mouth, and outputs it to the synchronization determining unit 300.

The third feature vector detecting unit 270 of the voice authentication processor 40 can detect a voice feature vector from a voice received via the microphone 123 (e.g., tone, frequency, words, speech speed, etc.). The third feature vector detecting unit 270 outputs the detected voice feature vector to the voice authentication unit 28 and the synchronization determining unit 300.

The synchronization determining unit 300 determines whether the object feature vector and the voice feature vector, transferred from the second 250 and third 270 feature vector detecting units, are synchronized with each other and outputs the synchronization information. For example, the synchronization determining unit 300 compares the movement of the lips according to the object feature vector with a dynamic feature of a voice according to the voice object to determine whether the two features are synchronized with each other. The synchronization determination is performed in such a way that a lip as an object has a dynamic feature vector via the learned statistic models (i.e., statistic models created by learning the movement of lips and the voice) and then a determination is made whether a voice feature vector corresponding to the dynamic feature vector is detected. Alternatively, the synchronization determination is performed in such a way that: the start and end of an actual spoken phrase, i.e., an utterance based on a feature vector of a lip object without a statistic model, and the start and end of an utterance based on the voice feature vector are detected, and then they are compared with each other.

The authentication determining unit 290 performs an integral authentication using the facial authentication information, transferred from the facial authentication processor 20, the synchronization information, transferred from the synchronization determining unit 300, and the voice authentication information transferred from the voice authentication processor 40 as described above, and then outputs the authentication outcome. If the authentication determining unit 290 analyzes the facial authentication information, the synchronization information, and the voice authentication information, and ascertains that they all correspond to an authorized user, it can authenticate the user, i.e., perform a normal user authentication. On the contrary, after analyzing the facial authentication information, the synchronization information, and the voice authentication information, if the authentication determining unit 290 detects that any one of them corresponds to an unauthorized user, it processes the user authentication as a failure. For example, if the authentication determining unit 290 detects that: the facial authentication information identifies the user's face as an authorized user; the voice authentication information identifies the user's voice as an authorized user; and the synchronization information indicates that the object feature vector and the voice feature vector are synchronized with each other, it can authenticate the user as an authorized user, i.e., it can conclude that the user authentication has been successful. On the contrary, if the authentication determining unit 290 detects that: the facial authentication information identifies the user's face as an unauthorized user; the voice authentication information identifies the user's voice as an unauthorized user; or the synchronization information indicates that the object feature vector and the voice feature vector are not synchronized with each other, it can process the user authentication as a failure.

Figure 4:
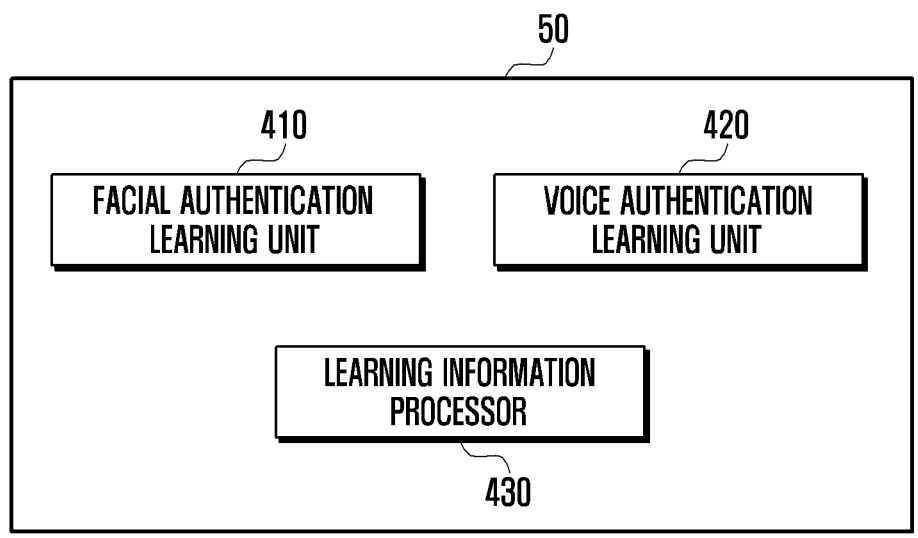
FIG. 4 illustrates a detailed view showing a statistic model managing unit of the controller shown in FIG. 1.

FIG. 4 illustrates a detailed view showing a statistic model managing unit 50 of the controller 180 shown in FIG. 1.

Referring to FIG. 4, the statistic model managing unit 50 includes a facial authentication learning unit 410, a voice authentication learning unit 420 and a learning information processor 430.

The facial authentication learning unit 410 creates a statistic model for facial recognition, based on the facial feature vector processed via the image authentication processor 10, and outputs it.

The voice authentication learning unit 420 creates a statistic model for speech recognition, based on the voice feature vector processed via the voice authentication processor 40, and outputs it.

The learning information processor 430 stores the statistic model for facial recognition and the statistic model for speech recognition in the storage unit 140, in order to perform user authentication with respect to the facial feature vector, the object feature vector, and the voice feature vector, which are detected in an authentication mode. The learning information processor 430 may store facial information and voice information in corresponding allocated storage areas, based on the statistic model for facial recognition and the statistic model for speech recognition, which are created by repeated learning. The facial information is managed, via a feature vector of a face and a feature vector of an object, according to a learned statistic model for facial recognition. The voice information is managed, via a feature vector, such as a unique tone, frequency, speech speed, etc. of a voice, and a feature vector such as words for security authentication (e.g., a word for a password, a word randomly selected to authenticate the user device, etc.), according to a learned statistic model for speech recognition.

Figure 5:
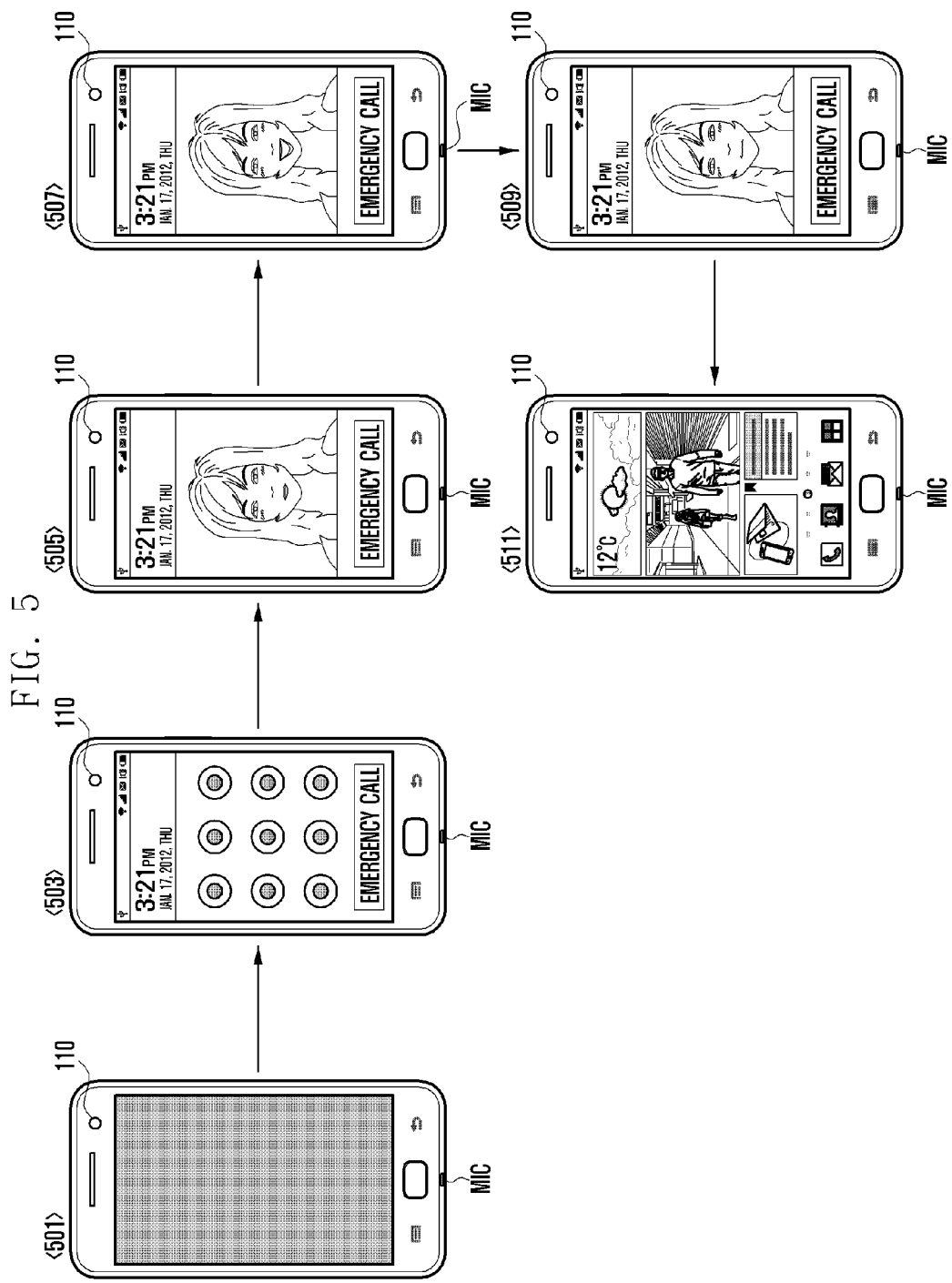
FIG. 5 illustrates screens describing a method for authenticating a user using hybrid biometrics information in a user device according to an embodiment of the invention.

FIG. 5 illustrates screens describing a method for authenticating a user using hybrid biometrics information in a user device 100 according to an embodiment of the invention.

It is assumed that the user device 100 operates in a lock mode where it shows a lock screen initially. The embodiment is described by performing an authentication procedure to release the lock screen as follows.

As shown in diagram 501 of FIG. 5, when the user device 100 operates in an idle mode, the display unit 130 is turned off. If the user operates the user device 100 (e.g., to operate a hot key, etc.), the display unit 130 is turned on. In an embodiment of the invention, it is assumed that the user device 100 has been locked to protect it from illegal access. Thus, when the user device 100 is activated from an idle state, the controller controls the display unit 130 to display a lock screen as shown in diagram 503.

When controlling the display unit 130 to display the lock screen as shown in diagram 503, the controller 180 determines whether a mode for user authentication has been set. If the controller 180 ascertains that a mode for user authentication has been set, it operates the camera module 110 and the microphone 123 and executes the authentication mode.

Thereafter, the controller 180 controls the display unit 130 to display an image acquired via the camera module 110 as shown in diagram 505. To this end, when the display unit 130 is turned on, the user aligns the user device 100 to a corresponding location so that the camera module 110 (i.e., the front camera) can photograph the user's face. The controller 180 controls the camera module 110 to transfer the image (the user's facial image) to the display unit 130 and controls the display unit 130 to display it. Here, the controller 180 controls the display unit 130 to overlay and display the image at a particular area on the lock screen. Alternatively, the controller 180 may control the display unit 130 to display the image on the lock screen without displaying the lock screen.

When the user's facial image is displayed on the display unit 130 as shown in diagram 505, the user may make utterances. Here, the display unit 130 displays images varied according to the user's utterances as shown in diagrams 505 to 509. The controller 180 controls the display unit 130 to display images acquired via the camera module 110, and also detects feature vectors for user authentication (e.g., facial feature vector and object feature vector) from the acquired images. In addition, the controller 180 also detects feature vectors for user authentication (e.g., tone, frequency, words, audio sound, etc.) from a voice acquired via the microphone 123.

The controller 180 performs: facial authentication using a facial feature vector detected from the image acquired via the camera module 110; voice authentication using a voice feature vector detected from the voice received via the microphone 123; and object authentication using an object feature vector detected from the acquired image. The controller 180 collects the results according to the facial authentication, voice authentication, and object authentication, and performs the final authentication with respect to the user. For example, if the controller 180 ascertains that: the facial image is identified as an authorized user's face via facial authentication; the voice is identified as the authorized user's voice via voice authentication; and a motion of the object is identified as a corresponding motion state (e.g., the movement of the face, the blinking of the eye, the movement of the mouth, etc.) via object authentication, it can identify the user as an authorized user.

In an alternate embodiment, the controller 180 performs: facial authentication using a facial feature vector detected from the image acquired via the camera module 110; voice authentication using a voice feature vector detected from the voice received via the microphone 123; and synchronization between the movement of lips according to a feature vector of an object detected from the acquired image and the voice according to the voice feature vector. The controller 180 collects the results according to the facial authentication, voice authentication, and synchronization authentication, and then performs the final authentication with respect to the user. For example, if the controller 180 ascertains that: the facial image is identified as an authorized user's face via facial authentication; the voice is identified as the authorized user's voice via voice authentication; and the voice of the utterance and the movement of lips are matched with each other via synchronization authentication, it can identify the user as an authorized user.

As described above, if the controller 180 identifies the user as an authorized user via integral authentication, it can process the user authentication and release the authentication mode. For example, the controller 180 can release the lock state, removing the lock screen, and display an execution screen as shown in diagram 511. Examples of the execution screen are a home screen, a screen that shows an application that has been executed before the user device 100 operates in an idle mode (i.e. before the display unit 130 is turned off), etc.

Since the system and method according to the invention additionally detects a state of an object motion via an object feature vector or a state as to whether a lip motion and a voice of a user are synchronized when performing user authentication using hybrid biometrics information, it can further strengthen user authentication. Therefore, the system and method according to the invention prevent unauthorized users to access the user device 100 by illegally using the authorized user's photograph or voice. That is, the system and method can block illegal access to information for user authentication of the user device 100. Although the embodiments were described in such a way that the authentication procedure, or integral authentication, releases a lock screen set by a lock function of the user device 100, it should be understood that the authentication procedure, or integral authentication, can also be applied to authentication processes with respect to: information (e.g., contact lists, personal data, etc.) that an authorized user needs to protect from unauthorized users; a determination as to whether to access a banking service via a user device; a paid service used via a user device; etc.

Figure 6:
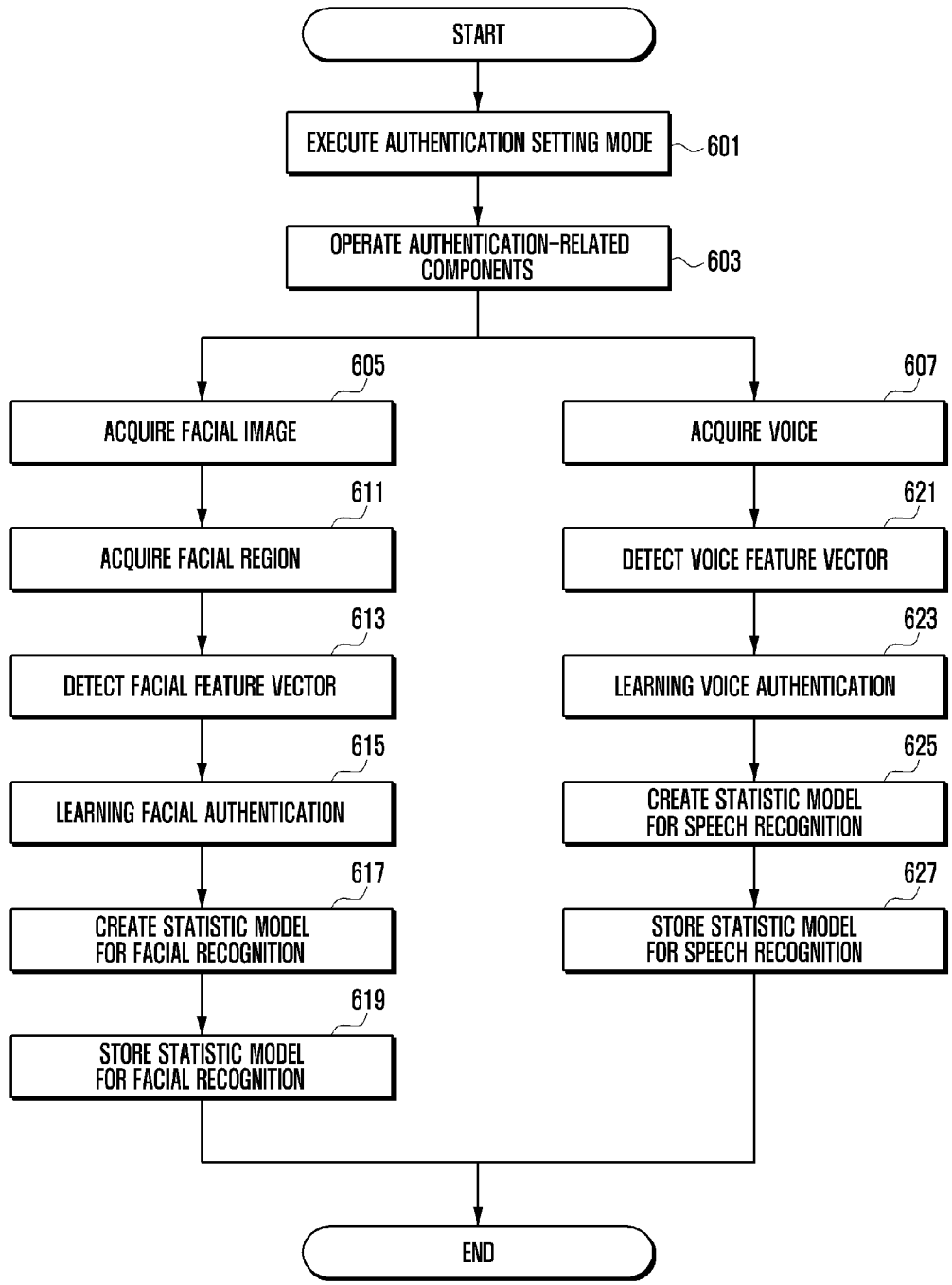
FIG. 6 illustrates a flow chart that describes a method or registering a statistic model for user authentication in a user device according to an embodiment of the invention.

FIG. 6 illustrates a flow chart that describes a method or registering a statistic model for user authentication in a user device according to an embodiment of the invention.

Referring to FIG. 6, the controller 180 executes an authentication setting mode according to a user's request (601), and operates authentication-related components (603). The authentication-related components refer to components for authenticating hybrid biometrics information, e.g., a camera module 110 and a microphone 123. The authentication-related component may further include a user interface for selecting one of the categories to execute an authentication mode when executing the authentication setting mode, for example, to execute an authentication mode when releasing a lock function, to execute an authentication mode when executing a contact list, to execute an authentication mode when executing a banking service; to execute an authentication mode when executing a paid service, etc. If one or more categories have been set via the user interface, the controller 180 can operate the authentication-related components.

After operating the authentication-related components, camera module 110 and microphone 123, at step 603, the controller 180 can acquire a facial image via the camera module 110 (605) and a voice via the microphone 123 (607). In the embodiment of the invention, statistic models for user authentication are acquired via a face learning process and a voice learning process. The face learning process and the voice learning process create statistic models for facial recognition and speech recognition respectively. The face learning process and the voice learning process may be performed simultaneously or separately. In an embodiment of the invention, as shown in FIG. 6, the face learning process and the voice learning process are performed simultaneously, in parallel. It should be understood that the face learning process and the voice learning process may be performed separately, in parallel. The option for operating the learning processes may also be set according to a user's settings.

In the face learning process, the controller 180 extracts a facial region from the acquired facial image (611), and detects a facial feature vector from the extracted facial region (613). For example, the controller 180 identifies a feature such as the face, eyes, mouth, etc. from the facial image acquired via the camera module 110 and extracts the facial region. The controller 180 normalizes the face shape using the center points of the eyes in the extracted facial region, and detects the facial feature vector from the normalized face shape. The controller 180 performs a facial authentication learning process via the facial feature vector (615) and creates the statistic model for facial recognition (617). The controller 180 stores the created statistic model in a corresponding area (e.g., the facial information storage area 160) of the storage unit 140 (619). For example, the controller 180 may perform a learning process for the facial feature vector based on a machine learning algorithm, such as Support Vector Machine (SVM), and create a statistic model for facial recognition to authenticate a user's face.

In the voice learning process, the controller 180 detects a voice feature vector from the acquired voice (621). For example, the controller 180 analyzes features such as tone, frequency, words, speech speed, etc. from a voice received via the microphone 123 and detects the voice feature vector. The controller 180 performs a voice authentication learning process via the voice feature vector (623) and creates the statistic model for speech recognition (625). The controller 180 stores the created statistic model in a corresponding area (e.g., the voice information storage area 170) of the storage unit 140 (627). For example, the controller 180 may perform a learning process for the voice feature vector based on a machine learning algorithm, such as Support Vector Machine (SVM), and create a statistic model for speech recognition to authenticate a user's voice.

The embodiment shown in FIG. 6 may also be modified in such a way that options for operating the authentication mode may be additionally set. For example, the embodiment may be modified to include additional options for selecting one of the integral authentications based on: facial authentication, voice authentication and authentication regarding variation in object motion, as described above referring to FIG. 2; and facial authentication, voice authentication and synchronization authentication (as to whether the change in motion of the lips as objects is synchronized with the acquired voice), as described above referring to FIG. 3. In the former integral authentication, a type of object to authenticate the change in motion (e.g., the movement of the face, the blinking of the eyes, the movement of the mouth, etc.) may be further set.

Figure 7:
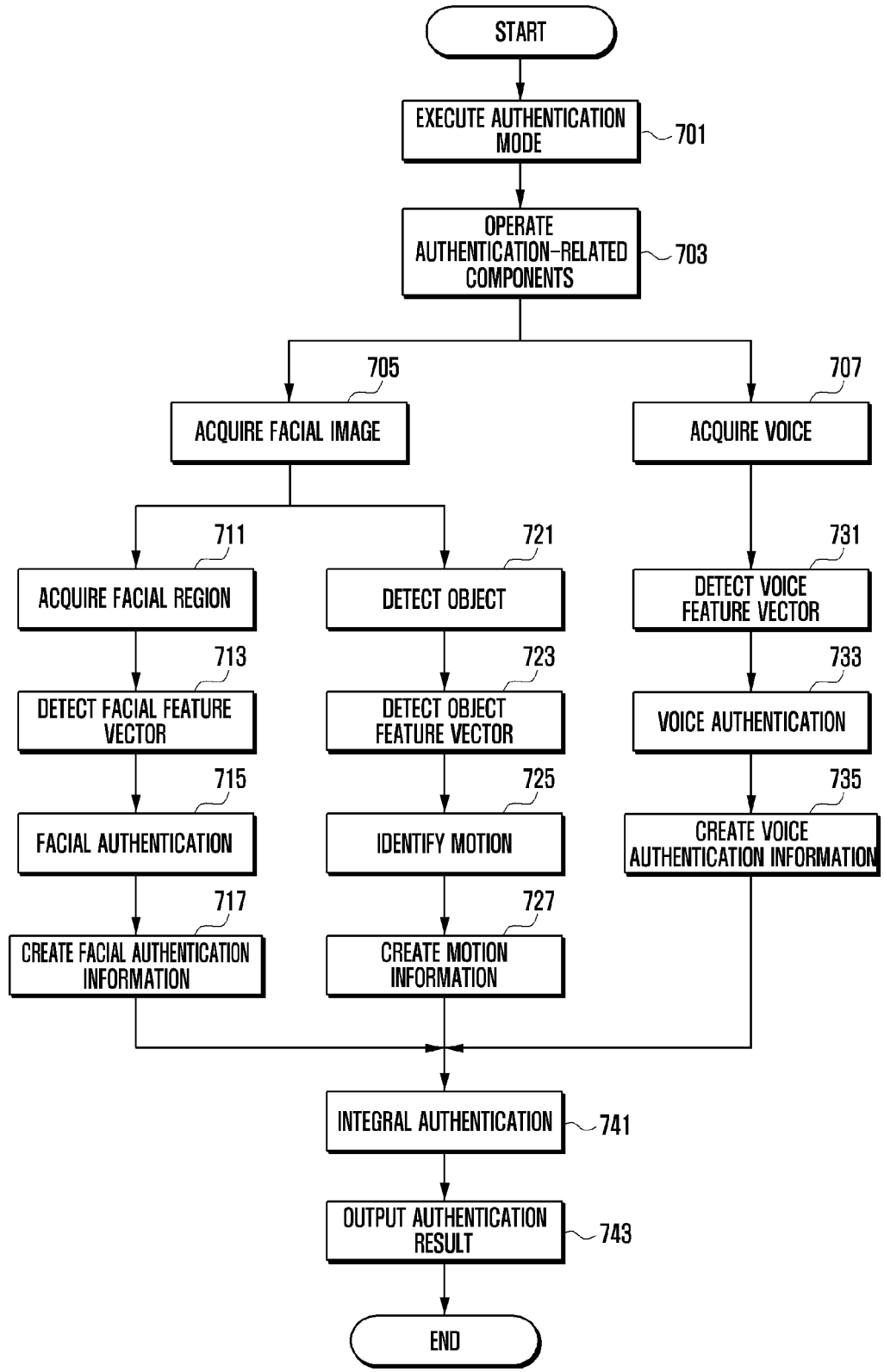
FIG. 7 illustrates a flow chart that describes a first embodiment of a method for performing user authentication in a user device according to the invention.

FIG. 7 illustrates a flow chart that describes a first embodiment of a method for performing user authentication in a user device according to the invention.

Referring to FIG. 7, the controller 180 executes an authentication mode when a specific function is executed in the user device 100 (701), and operates authentication-related components (703). For example, when the user requests to execute a function, the controller 180 determines whether an authentication mode for user authentication has been set to execute the requested function. If the controller 180 ascertains that an authentication mode for user authentication has been set to execute the requested function, it can control the execution of the authentication mode. When executing the authentication mode, the controller 180 operates a camera module 110 and a microphone 123 which have been set to perform user authentication. Examples of the function to which the authentication mode can be set are a user's set functions, such as a lock function, a banking service function, a paid service function, a contact list access function, etc.

After operating the authentication-related components, camera module 110 and microphone 123, at step 703, the controller 180 can acquire a facial image via the camera module 110 (705) and a voice via the microphone 123 (707). In the embodiment of the invention, the user authentication includes an image authentication process and a voice authentication process that may be performed simultaneously (in parallel) or separately (in order). The image authentication process includes a facial authentication process and an object authentication process that may be performed simultaneously (in parallel) or separately (in order). Performing the authentication processes simultaneously (in parallel) or separately (in order) may be set according to a user's settings.

In the facial authentication process, the controller 180 extracts a facial region from the acquired facial image (711), and detects a facial feature vector from the extracted facial region (713). For example, the controller 180 identifies a feature such as the face, eyes, mouth, etc. from the facial image acquired via the camera module 110 and extracts the facial region. The controller 180 normalizes the face shape using the center points of the eyes in the extracted facial region, and detects the facial feature vector from the normalized face shape. After that, the controller 180 performs facial authentication by comparing the facial feature vector with the statistic model for facial recognition created by learning (715) and creates the facial authentication information (717).

In the object authentication process, the controller 180 detects an object from the acquired facial image (721), and extracts an object feature vector from the extracted object (723). The object refers an element (elements) to identify the movement in a user's face, e.g., the face, eyes, mouth, etc. in the embodiment. For example, the controller 180 may detect a location of a preset object from the facial image acquired via the camera module 110, e.g., a facial region, eye regions, or mouth region, and then the object feature vector (e.g., the movement of the face, the blinking of the eyes, the movement of the mouth, etc.) representing the movement (motion) of the object at the detected location. After that, the controller 180 identifies the motion of the object from the object feature vector (725) and creates the motion information (727).

In the voice authentication process, the controller 180 detects a voice feature vector from the acquired voice (731). For example, the controller 180 analyzes features such as tone, frequency, words, speech speed, etc. from a voice received via the microphone 123 and detects the voice feature vector. After that, the controller 180 performs voice authentication by comparing the voice feature vector with the statistic model for speech recognition created by learning (733) and creates the voice authentication information (735).

After that, the controller 180 performs an integral authentication based on the facial authentication information, the motion information, and the voice authentication information (741), and outputs the authentication result (743). For example, if the controller 180 detects that: the facial authentication information identifies the user's face as an authorized user; a motion of the object determined by the motion information is identified as a corresponding motion; and the voice authentication information identifies the user's voice as an authorized user, it authenticates the user as an authorized user, i.e., it concludes that the user authentication has been successful, and outputs the authentication result (e.g., lock screen has been released, paid service can be used, contact list is displayed, etc.). On the contrary, if the controller 180 detects that: the facial authentication information identifies the user face as an unauthorized user; a motion of the object determined by the motion information is not identified as a corresponding motion; or the voice authentication information identifies the user's voice as an unauthorized user, it processes the user authentication as a failure and outputs the authentication result (e.g., a message indicating that the authentication has failed).

Figure 8:
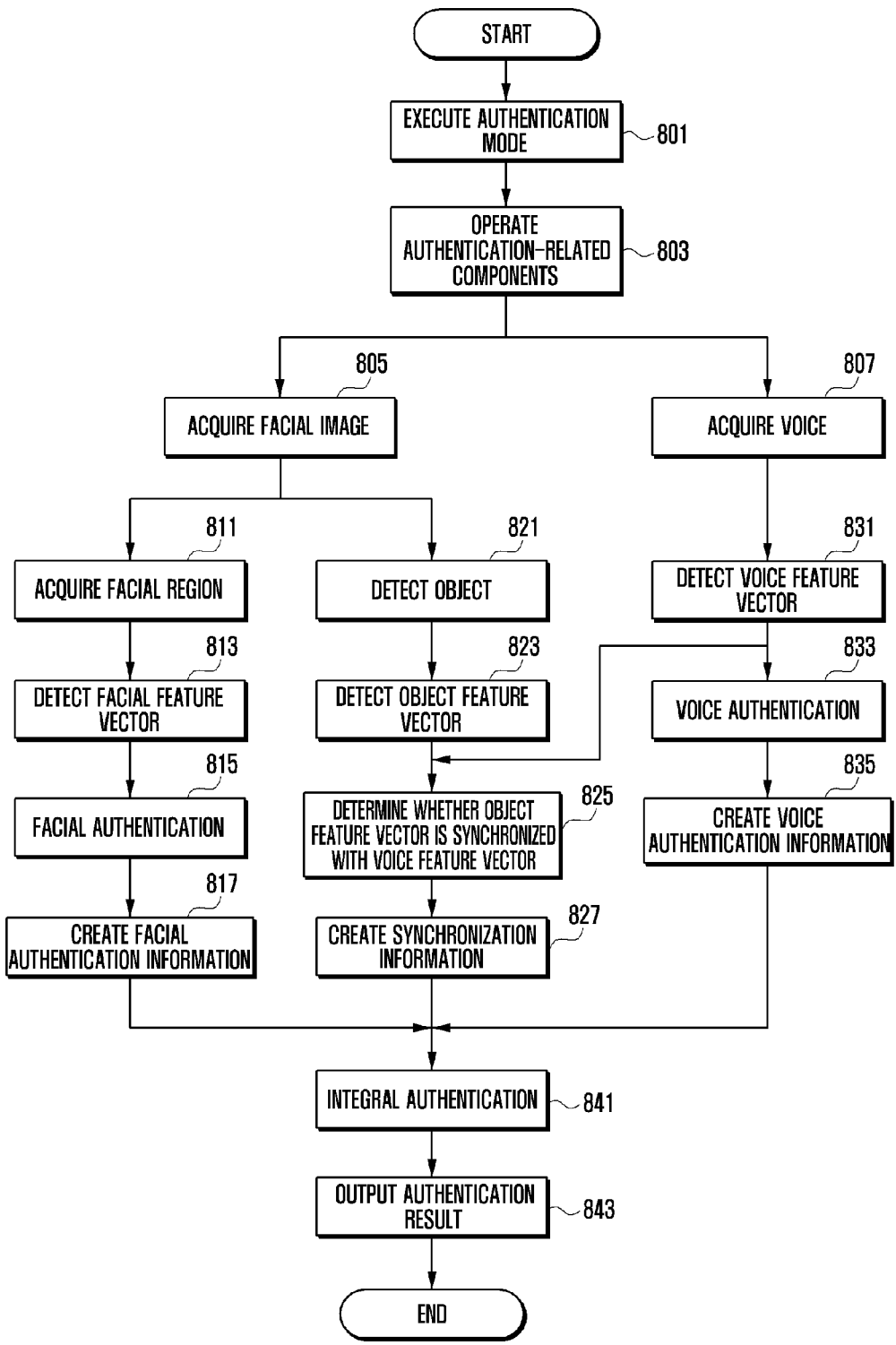
FIG. 8 illustrates a flow chart that describes a second embodiment of a method for performing user authentication in a user device according to the invention.

FIG. 8 illustrates a flow chart that describes a second embodiment of a method for performing user authentication in a user device according to the invention.

Referring to FIG. 8, the controller 180 executes an authentication mode when a specific function is executed in the user device 100 (801). The controller 180 operates authentication-related components, e.g., camera module 110 and microphone 123, (803).

After that, the controller 180 can acquire a facial image via the camera module 110 (805) and a voice via the microphone 123 (807). In the embodiment of the invention, the user authentication includes an image authentication process and a voice authentication process. The image authentication process includes a facial authentication process and an object authentication process. The authentication processes may be simultaneously (in parallel) or separately (in order) performed according to a user's settings.

In the facial authentication process, the controller 180 extracts a facial region from the acquired facial image (811), and detects a facial feature vector from the extracted facial region (813). The controller 180 performs facial authentication by comparing the detected facial feature vector with the statistic model for facial recognition created by learning (815) and creates the facial authentication information (817).

In the object authentication process, the controller 180 detects an object from the acquired facial image (821), and extracts an object feature vector from the extracted object (823). The controller 180 determines whether the object feature vector is synchronized with a voice feature vector detected via the voice authentication process, which will be described later, (825). For example, the controller 180 compares the motion of the lips corresponding to the object feature vector with the dynamic feature of the voice corresponding to the voice feature vector, thereby making a determination as to whether the two features are synchronized with each other. After that, the controller 180 creates the synchronization information (827).

In the voice authentication process, the controller 180 detects a voice feature vector from the acquired voice (831). The controller 180 performs voice authentication by comparing the detected voice feature vector with the statistic model for speech recognition created by learning (833) and creates the voice authentication information (835). While the controller 180 is performing the voice authentication using the detected voice feature vector, it can perform synchronization authentication between the voice feature vector and the object feature vector.

After that, the controller 180 performs an integral authentication based on the facial authentication information, the synchronization information, and the voice authentication information (841), and outputs the authentication result (843). For example, if the controller 180 detects that: the facial authentication information identifies the user's face as an authorized user; the voice authentication information identifies the user's voice as an authorized user; and the synchronization information indicates that the object feature vector and the voice feature vector are synchronized with each other, it authenticates the user as an authorized user, i.e., it concludes that the user authentication has been successful, and outputs the authentication result. On the contrary, if the controller 180 detects that: the facial authentication information identifies the user's face as an unauthorized user; the voice authentication information identifies the user's voice as an unauthorized user; or the synchronization information indicates that the object feature vector and the voice feature vector are not synchronized with each other, it processes the user authentication as a failure and outputs the authentication result.

Figure 9:
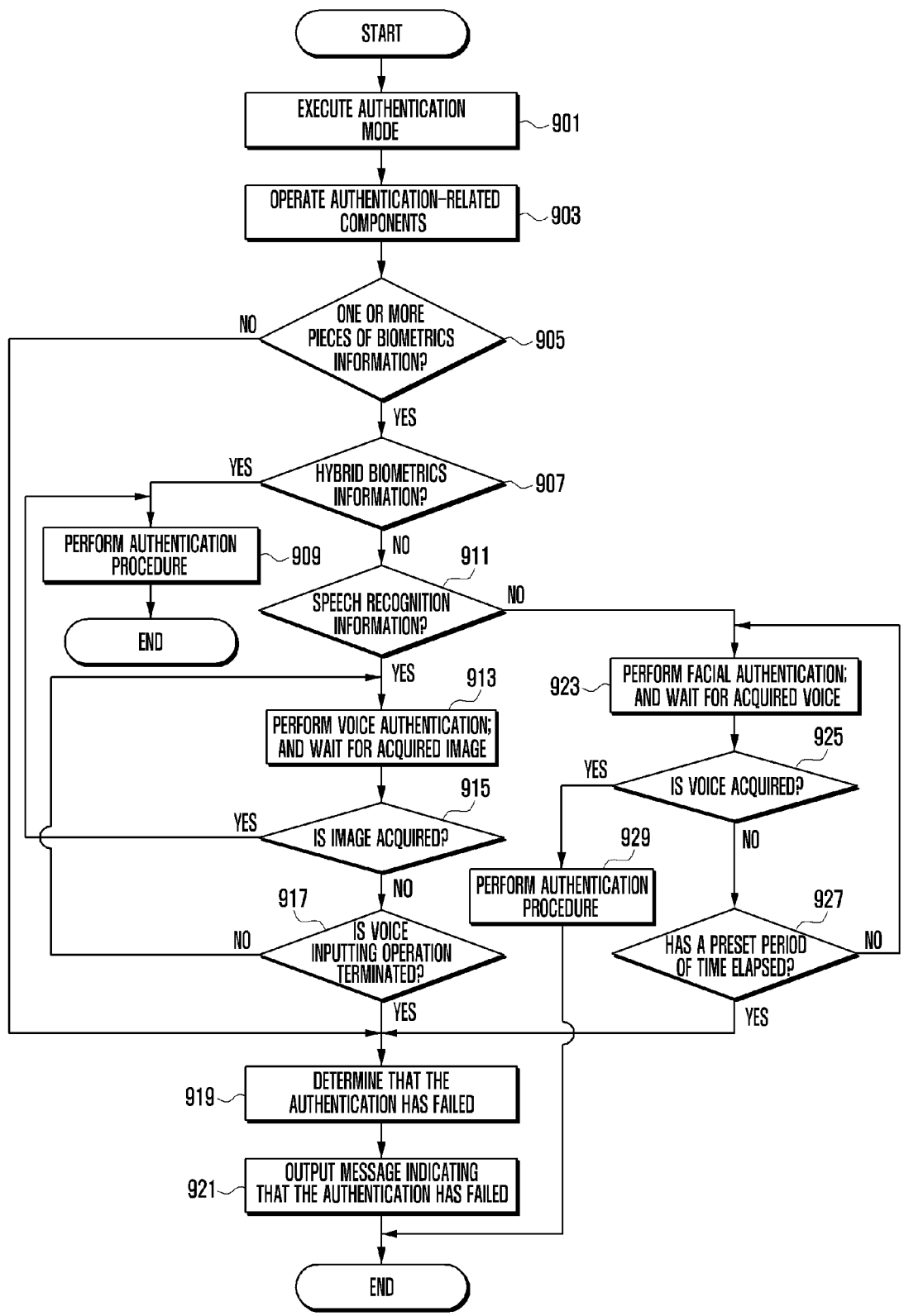
FIG. 9 illustrates a flow chart that describes a method for performing user authentication in a user device according to an embodiment of the invention.

FIG. 9 illustrates a flow chart that describes a method for performing user authentication in a user device according to an embodiment of the invention.

The embodiment describes operations of a user device 100 if either the camera module 110 or the microphone 123 outputs biometrics information.

Referring to FIG. 9, the controller 180 executes an authentication mode when a specific function is executed in the user device 100 (901). The controller 180 operates authentication-related components, e.g., camera module 110 and microphone 123, (903).

After that, the controller 180 determines whether one or more pieces of biometrics information are detected via the camera module 110 and the microphone 123 (905).

If the controller 180 ascertains that any biometrics information is not detected via the camera module 110 and the microphone 123 at step 905, it concludes that the user authentication has failed (919) and outputs the corresponding message indicated that the user authentication has failed (921). An example of the failure of the user authentication is a state where the camera module 110 doesn't acquire a user's face and the microphone 123 doesn't receive a voice. Alternatively, the embodiment may be modified in such a way that, if the controller 180 has not received biometrics information via the camera module 110 and the microphone 123 until a preset period of time has elapsed, it can determine that the user authentication has failed.

On the contrary, if the controller 180 ascertains that one or more pieces of biometrics information are detected via the camera module 110 and the microphone 123 at step 905, it further determines whether the detected biometrics information corresponds to hybrid biometrics information that refers to a number of pieces of biometrics information (907). If the controller 180 ascertains that the detected biometrics information corresponds to hybrid biometrics information at step 907, it performs the integral authentication using the hybrid biometrics information as described above (909). On the contrary, if the controller 180 ascertains that the detected biometrics information is one piece of biometrics information at step 907, it further determines whether the biometrics information corresponds to information for speech recognition or image recognition (911).

If the controller 180 ascertains that the biometrics information corresponds to information for speech recognition at step 911, it performs voice authentication using the voice received via the microphone 123 and waits for an image acquired via the camera module 110 (913). During the process, the controller 180 determines whether to acquire an image via the camera module 110 (915).

If the controller 180 receives the image acquired via the camera module 110 at step 915, it performs an integral authentication with respect to the user at 909. After performing image authentication via the image acquired via the camera module 110, it can perform an integral authentication based on the information according to the voice authentication and the information according to the image authentication.

On the contrary, if the controller 180 ascertains that an image has not been acquired via the camera module 110 at step 915, it further determines whether the operation for inputting the voice via the microphone 123 is terminated (917). If the controller 180 ascertains that the operation for inputting the voice via the microphone 123 is not terminated at step 917, it returns to and proceeds with step 913. If the controller 180 ascertains that the operation for inputting the voice via the microphone 123 is terminated at step 917, it proceeds with step 919 and concludes that the user authentication has failed. After that, the controller 180 outputs the message indicating that the user authentication has failed at step 921.

Meanwhile, if the controller 180 ascertains that the biometrics information corresponds to information for image recognition at step 911, it performs image authentication using the image acquired via the camera module 110 and waits for a voice received via the microphone 123 (923). During the process, the controller 180 determines whether to acquire a voice via the microphone 123 (925).

If the controller 180 receives the voice acquired via the microphone 123 at step 925, it performs an integral authentication with respect to the user at 929. After performing voice authentication via the voice acquired via the microphone 123, it can perform an integral authentication based on the information according to the image authentication and the information according to the voice authentication.

On the contrary, if the controller 180 ascertains that the voice has not been acquired via the microphone 123 at step 925, it determines whether a preset period of time has elapsed (927). If the controller 180 ascertains that a preset period of time has not elapsed at step 927, it returns to and proceeds with step 923. If the controller 180 ascertains that a preset period of time has elapsed at step 927, it proceeds with step 919 and concludes that the user authentication has failed. After that, the controller 180 outputs the message indicating that the user authentication has failed at step 921.

If a user needs to authenticate himself/herself as an authorized user of his/her user device, via voice authentication for example, he/she places the microphone of the user device close to his/her mouth when making an utterance for voice authentication. For example, if a user wants to shield his/her voice from others or is in an environment where he/she must speak quietly, he/she can make an utterance to the microphone close to the mouth. In that case, the user's face may not be identified via the camera module 110. Alternatively, the user may allow the user authentication system to identify his/her face and then make an utterance to input his/her voice to the system. As described above, although the system and method according to the invention may not detect a number of pieces of biometrics information, simultaneously, but only one piece of biometrics information, in various environments, it can wait for the other pieces of biometrics information that were not detected, for a preset period of time, according to a preset routine. This can be reduced to make a determination that the user authentication has failed in the user device, which is executed irrespective of the user's settings.

As described above, since the user authentication system and method according to the invention can perform user authentication in a user device, using hybrid biometrics information, it can increase the security performance, compared with conventional user authentication systems that perform user authentication using single biometrics information (e.g., voice information via speech recognition, image information via facial recognition, etc.). Since the user authentication system and method according to the invention can perform integral user authentication in a user device, based on hybrid biometrics information such as image authentication information and voice authentication information, it can increase the security performance, compared with conventional user authentication systems. Since the user authentication system and method according to the invention can perform integral user authentication in a user device, based on image authentication information, voice authentication information, and additional information regarding the variation in face shape, mouth shape, and eye shape, with an additional determination as to whether to synchronize a mouth motion and a voice, it can increase the security performance and enable only an authorized user to access the user device.

The user authentication system and method according to the invention can use a camera module or a microphone installed to a user device in order to perform user authentication, without additional parts (e.g., sensors, etc.). The user authentication system and method according to the invention can be applied to all types of user devices and their applications. The user authentication system and method according to the invention can create an environment where user devices can optimally perform user authentication, thereby enhancing use convenience and product competitiveness.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a met hod as claimed in any one of the claims of this specification and a machine-readable storage storing such a program. Still further, such programs may be conveyed electronically via any medium such as a communication signal carried over a wired or wireless connection and embodiments suitably encompass the same.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A user authentication method comprising:
receiving by a camera or a microphone of electronic device at least one of image information or voice information, respectively;
identifying by a controller of the electronic device when only one of the at least one of image information and voice information has been received, whether another of the image information and voice information is received such that both image information and the voice information for authentication are received during a predetermined time period;
detecting, if both image information and voice information are received within the predetermined time period, an object feature vector value based on the image information and a voice feature vector value based on the voice information;
performing an integral user authentication for authentication by determining whether each of the detected feature vector values respectively matches with pre-stored information according to a respective user settable probability over a predetermined amount;
determining, by a synchronization detection unit, whether the object feature vector value and the voice feature vector value are synchronized with each other, and outputting synchronization information;
wherein when the synchronization information indicates that the object feature vector and the voice feature vector value are synchronized with each other, outputting information that the authentication is successful;
wherein when the synchronization information indicates that the object feature vector and the voice feature vector are not synchronized with each other, outputting information that the authentication has failed; and
outputting information indicating the user authentication has failed if the predetermined time period has elapsed and both image information and voice information have not been received.

2. The method of claim 1, wherein performing the integral user authentication comprises at least one of the following:
determining whether a value for a preset word matches the detected voice feature vector value;
determining whether a motion state of an object of the image information is synchronized with the received voice information; and
determining whether the motion state of the object of the image information matches a motion state of one or more preset objects.

3. The method of claim 1, wherein performing the integral user authentication comprises:
displaying, by a controller, a randomly selected word; and
determining whether the detected voice feature vector value matches a feature vector value of the selected word over the predetermined amount.

4. The method of claim 1, further comprising:
generating facial authentication information for a facial feature vector value, motion information for the object feature vector value, and voice authentication information for the voice feature vector value to perform the integral user authentication.

5. A user authentication method comprising:
acquiring by an electronic device at least a first type of biometrics information for authentication;
identifying by a controller, if only one type of biometrics information is received, whether a second type of biometrics information is additionally acquired during a predetermined time period;
generating, if the second type of biometric information is acquired within the predetermined time period, a plurality of authentication information corresponding to the acquired biometrics information respectively, and performing an integral user authentication for authentication based on the generated authentication information by determining whether feature values of generated information respectively matches with previously stored information by a respective user settable probability over a predetermined amount;
determining, by a synchronization detection unit, whether an object feature vector value and a voice feature vector value are synchronized with each other, and outputting synchronization information;
wherein when the synchronization information indicates that the object feature vector value and the voice feature vector value are synchronized with each other, outputting information that the authentication is successful;
wherein when the synchronization information indicates that the object feature vector value and the voice feature vector value are not synchronized with each other, outputting information that the authentication has failed; and
outputting information indicating the user authentication has failed if the predetermined time period has elapsed without receiving at least two types of biometrics information.

6. The method of claim 5, wherein the acquiring comprises:
acquiring image information via a camera module; and
acquiring voice information via a microphone.

7. The method of claim 6, wherein the generating comprises:
detecting a facial feature vector value and the object feature vector value based on the image information, and the voice feature value based on the voice information;
generating facial authentication information using the facial feature vector value;
generating voice authentication information using the voice feature vector value; and
generating motion information using the object feature vector value.

8. The method of claim 7, wherein the motion information comprises:
information regarding a motion state of a preset object.

9. The method of claim 7, wherein performing the integral user authentication comprises:
determining whether the authentication is successful based on the facial authentication information, the voice authentication information, and the motion information by determining whether the detected feature vector values match prestored information over a predetermined amount.

10. The method of claim 6, wherein the generating the plurality of authentication information corresponding to the acquired biometrics information comprises:
detecting a facial feature vector value and the object feature vector value based on the image information, and the voice feature vector value based on the voice information;
generating facial authentication information using the facial feature vector value;

generating voice authentication information using the voice feature vector value; and generating synchronization information using the object feature vector value and the voice feature vector value.

11. The method of claim 10, wherein performing the integral user authentication comprises:

determining whether the authentication is successful based on the facial authentication information, the voice authentication information, and the synchronization information by determining whether the detected feature vector values match prestored information over a predetermined amount.

12. A mobile device comprising:
a camera module;
a microphone; and
a controller configured to:
  acquire, via the camera module and the microphone, at least one of an image information and a voice information;
  identify, if only one of the image information or the voice information is received, whether a the other of the image information and the voice information is additionally received during a predetermined time period;
  detect, if another of the image information and voice information is received within the predetermined time period, an object feature vector value based on the acquired image information and a voice feature vector value based on the acquired voice information, and perform an integral user authentication for authentication by determining whether the detected feature vector values respectively match with pre-stored information over a predetermined amount;
  a synchronization detection unit that determines whether the object feature vector value and the voice feature vector value are synchronized with each other, and outputs synchronization information;
  wherein when the synchronization information indicates that the object feature vector value and the voice feature vector value are synchronized with each other, output information that the authentication is successful;
  wherein when the synchronization information indicates that the object feature vector value and the voice feature vector value are not synchronized with each other, output information that the authentication has failed; and
  output information indicating user authentication has failed if the predetermined time period has elapsed and both image information and voice information have not been received.

13. The mobile device of claim 12, wherein the controller performs at least one of the following:
  determining whether a value for a preset word matches the voice feature vector value;
  determining whether a motion state of an object is synchronized with the voice information; and
  determining whether a motion state of the object matches a motion state of one or more preset objects.

14. The mobile device of claim 12, further comprising:
a display for displaying a randomly selected word,
wherein the controller determines whether the voice feature vector value matches a feature vector value of the selected word over the predetermined amount.

15. The mobile device of claim 12, wherein the controller: generates facial authentication information for a facial feature vector value, motion information for the object feature vector value, and voice authentication information for the voice feature vector value; and determines whether the generated authentication information matches preset authentication information.

16. The mobile device of claim 15, wherein the controller concludes that the authentication has failed when at least one of the facial authentication information, the voice authentication information, and the motion information is not authenticated.

17. A user device comprising:
a camera module;
a microphone; and
a controller configured to:
  acquire at least one biometrics information of at least two types of biometrics information used for authentication;
  identify, if only one of biometrics information is received, whether another of the at least two types of biometrics information is acquired such that the at least two types of biometrics information are acquired during a predetermined time period;
  perform, if the at least two types of biometrics information are acquired within the predetermined time period, an integral user authentication using a plurality of authentication information that are generated based on the acquired biometrics information;
  a synchronization detection unit that determines whether an object feature vector value and a voice feature vector value are synchronized with each other, and outputs synchronization information;
  wherein when the synchronization information indicates that the object feature vector value and the voice feature vector value are synchronized with each other, output information that the authentication is successful;
  wherein when the synchronization information indicates that the object feature vector value and the voice feature vector value are not synchronized with each other, output information that the authentication has failed; and
  output information indicating user authentication has failed if the predetermined time period has elapsed.

18. The user device of claim 17, wherein the controller further configured to:
  detect a facial feature vector value and the object feature vector value from an image acquired via the camera module;
  detect a voice feature vector value from a voice acquired via the microphone; and
  perform the integral user authentication based on the plural authentication information transferred from an image authentication processor and a voice authentication processor.

19. The user device of claim 18, wherein the controller further configured to:
  detect a static, facial feature vector value based on a still image captured from the image and perform a facial authentication using the detected facial feature vector value; and
  detect the object feature vector value representing a dynamic state of the object determined via the image and perform an object authentication using the detected object feature vector value.

20. The user device of claim 19, wherein the controller further configured to:
  perform user authentication by identifying a motion of an object based on the object feature vector value; and/or determine whether the object feature vector value is synchronized with the voice feature vector value.

21. The user device of claim 20, wherein the controller determines whether the authentication is successful based on a facial authentication information output by a facial authentication processor, a voice authentication information output by the voice authentication processor, and a motion information output by a motion determining unit.

22. The user device of claim 20, wherein the controller determines whether the authentication is successful based on the facial authentication information output by a facial authentication processor, the voice authentication information output by the voice authentication processor, and the synchronization information output.

23. The user device of claim 17, further comprising:
a memory for storing statistic models for facial recognition and speech recognition.

* * * * *